United States Patent
Wynn et al.

(10) Patent No.: US 9,531,835 B2
(45) Date of Patent: Dec. 27, 2016

(54) SYSTEM AND METHOD FOR ENABLING WIRELESS SOCIAL NETWORKING

(75) Inventors: Simon Wynn, Redwood City, CA (US); David G. Fraser, Oakland, CA (US)

(73) Assignee: DEVICESCAPE SOFTWARE, INC., San Bruno, CA (US)

(*) Notice: Subject to any disclaimer, the term of this patent is extended or adjusted under 35 U.S.C. 154(b) by 0 days.

(21) Appl. No.: 11/823,698

(22) Filed: Jun. 27, 2007

(65) Prior Publication Data

US 2008/0195741 A1    Aug. 14, 2008

Related U.S. Application Data

(60) Provisional application No. 60/901,161, filed on Feb. 13, 2007.

(51) Int. Cl.
| | |
|---|---|
| G06F 15/16 | (2006.01) |
| H04L 29/08 | (2006.01) |
| G06Q 10/10 | (2012.01) |
| H04L 29/06 | (2006.01) |
| H04W 12/08 | (2009.01) |
| H04W 84/12 | (2009.01) |
| H04W 12/06 | (2009.01) |

(52) U.S. Cl.
CPC .............. *H04L 67/34* (2013.01); *G06Q 10/10* (2013.01); *H04L 63/102* (2013.01); *H04L 67/30* (2013.01); *H04W 12/08* (2013.01); *H04W 12/06* (2013.01); *H04W 84/12* (2013.01)

(58) Field of Classification Search
CPC ........ H04L 67/34; H04L 63/102; H04L 67/30; G06Q 10/10; H04W 84/12; H04W 12/06; H04W 12/08

USPC ....... 709/204, 205, 206, 229, 225, 220–222; 715/751–759

See application file for complete search history.

(56) References Cited

U.S. PATENT DOCUMENTS

| | | | |
|---|---|---|---|
| 7,424,605 B2 | 9/2008 | Arai | |
| 7,533,160 B2 * | 5/2009 | Hsu | ............................... 709/220 |
| 2005/0255886 A1 | 11/2005 | Aaltonen et al. | |
| 2006/0184997 A1 * | 8/2006 | La Rotonda et al. | ............ 726/2 |
| 2006/0294244 A1 | 12/2006 | Naqvi et al. | |
| 2008/0005235 A1 * | 1/2008 | Hegde et al. | ................. 709/204 |

(Continued)

FOREIGN PATENT DOCUMENTS

| | | |
|---|---|---|
| JP | 2003304518 | 10/2003 |
| JP | 2004274602 A | 9/2004 |

(Continued)

OTHER PUBLICATIONS

International Application No. PCT/US2007/014916, International Search Report and Written Opinion mailed Jan. 29, 2008.

(Continued)

*Primary Examiner* — Kenneth R Coulter
(74) *Attorney, Agent, or Firm* — Sheppard Mullin Richter & Hampton LLP (57) ABSTRACT

Exemplary systems and methods for sharing a personal network of a first user are provided. The exemplary method comprises receiving credentials for the personal network which are used to generate a network profile. When an indication to share the personal network is received, one or more user devices of a second user are queued to receive the network profile. The network profile is then provided to the one or more user devices to provision the one or more user devices for accessing the personal network.

19 Claims, 6 Drawing Sheets

(56) References Cited

U.S. PATENT DOCUMENTS

2008/0133716 A1* 6/2008 Rao et al. .................. 709/220
2008/0228947 A1* 9/2008 Markus et al. .............. 709/249
2009/0055476 A1* 2/2009 Markus et al. .............. 709/204
2013/0058274 A1* 3/2013 Scherzer et al. ............ 370/328

FOREIGN PATENT DOCUMENTS

| WO | 2005117479 | 12/2005 |
| WO | 2006013937 | 2/2006 |

OTHER PUBLICATIONS

European Application No. 07809944.7, Extended European Search Report mailed Oct. 5, 2011.

* cited by examiner

SYSTEM AND METHOD FOR ENABLING WIRELESS SOCIAL NETWORKING

CROSS-REFERENCE TO RELATED APPLICATION

The present application claims priority benefit from U.S. Provisional Patent Application Ser. No. 60/901,161, filed Feb. 13, 2007, and entitled "Enabling a Social Wireless Network," which is herein incorporated by reference.

BACKGROUND

1. Field of the Invention

Embodiments of the present invention relate generally to networking, and more particularly, to providing wireless network access on personal networks.

2. Description of Background Art

Wireless networking technology or wireless fidelity (Wi-Fi) follows the IEEE 802.11 standard. Wi-Fi uses unlicensed radio spectrum and, as a result, allows very low cost wireless data networks to be implemented. The growth of Wi-Fi has been substantial in recent years, with millions of private networks deployed in homes and businesses, and hundreds of thousands public networks, know as "hotspots", having been deployed. Analysts also predict that by 2010 there may be around one billion computing devices deployed that can utilize these Wi-Fi networks.

Recently a new paradigm in Internet usage has emerged where groups of people congregate on websites based on common interests or goals, and as a result, create virtual online communities. In most cases, members of such online communities will usually choose or pre-approve other members before they are allowed to join the community or sub-community on the web site. This type of website is referred to as a "social networking" site. An example of a social networking site is. MySpace, which gives users the ability to create groups that share common interests or affiliations, upload videos, and hold discussions in forums. Other examples of such sites are Facebook and LinkedIn. This trend of new websites is often referred to as "Web 2.0".

For some time, most Internet messaging (IM) services have offered a concept of "buddy lists", where an IM user pre-approves other IM users they have chosen to communicate with prior to adding them to their own personal buddy list. This ensures that only a user's "buddies" can initiate chat sessions or Internet phone sessions with the user.

Recently, the growth of home Wi-Fi networks has been substantial. Millions of home users have seen the advantage of enabling a home network without wires. However, security issues become prevalent since many home networks are left open (i.e., with no form of encryption or authentication) allowing anyone to access the user's home network. As home Wi-Fi users have become more educated, more and more users now utilize one of several 802.11 based security standards, typically WEP (Wireless Equivalent Privacy) or WPA (Wireless Protected Access). While these standards offer protection for the user's home network, they prevent any use of the network by friends or other visitors to the user's home without going through complex network setup. Even if this network setup is performed, it may not be easy to revoke access at a later date.

Typically, Wi-Fi networks in homes, businesses, and hotspots are identified by a human readable name called a SSID (Service Set Identifier). An example of the SSID may be "My Home Network." In addition to the SSID, when a secure Wi-Fi network is first connected, various security parameters need to be entered to configure either the WEP or WPA (or other) security schemes. Most computers and devices that can access Wi-Fi networks store the combination of SSID and security information (and other network information) so that this information does not have to be entered next time the device attempts to connect to the network. This combination of information is known as a Wi-Fi or network profile.

Therefore, there is a need for social wireless networking capability that may be used to apply the social networking concept to one or more private/personal Wi-Fi networks that can be shared by a social group.

SUMMARY OF THE INVENTION

Embodiments of the present invention provide systems and methods for sharing a personal network which provide access to a communication network. The exemplary method comprises receiving credentials for the personal network of a first user. The credentials are utilized to generate a network profile comprising network settings, security information, and keys.

Messages may be exchanged between the first user to a second user regarding sharing of the first user's personal network. In one embodiment, the message comprises an invitation from the first user to share their personal network. In an alternative embodiment, the message comprises a request from the second user to the first user to access the first user's personal network.

An acceptance indication for sharing the personal network may then be received. If the message is a request, the acceptance indication may comprise the first user's acceptance of the request. If the message is an invitation, the acceptance indication may comprise the second user's acceptance of the invitation. Once accepted, the user accounts of both users are updated to reflect the sharing of the personal network.

One or more user device of the second user are queued to receive a network profile associated with the shared personal network. The network profile is provided to the one or more user devices to provision the one or more user devices for accessing the shared personal network. The network profile may be provided during a next poll by the user device. The poll may occur periodically or during a next connection by the user device to the communication network.

DETAILED DESCRIPTION OF EXEMPLARY EMBODIMENTS

Embodiments of the present invention provide systems and methods for enabling wireless social networking. Exemplary embodiments allow users to share their private/personal networks (e.g., access points) with other users. When a first user allows access to their personal network to a second user, a network profile comprising network access and security information is provided to devices of the second user. In this way, the second user does not need to manually determine access and security information or configure their devices to work on the personal network.

Figure 1:
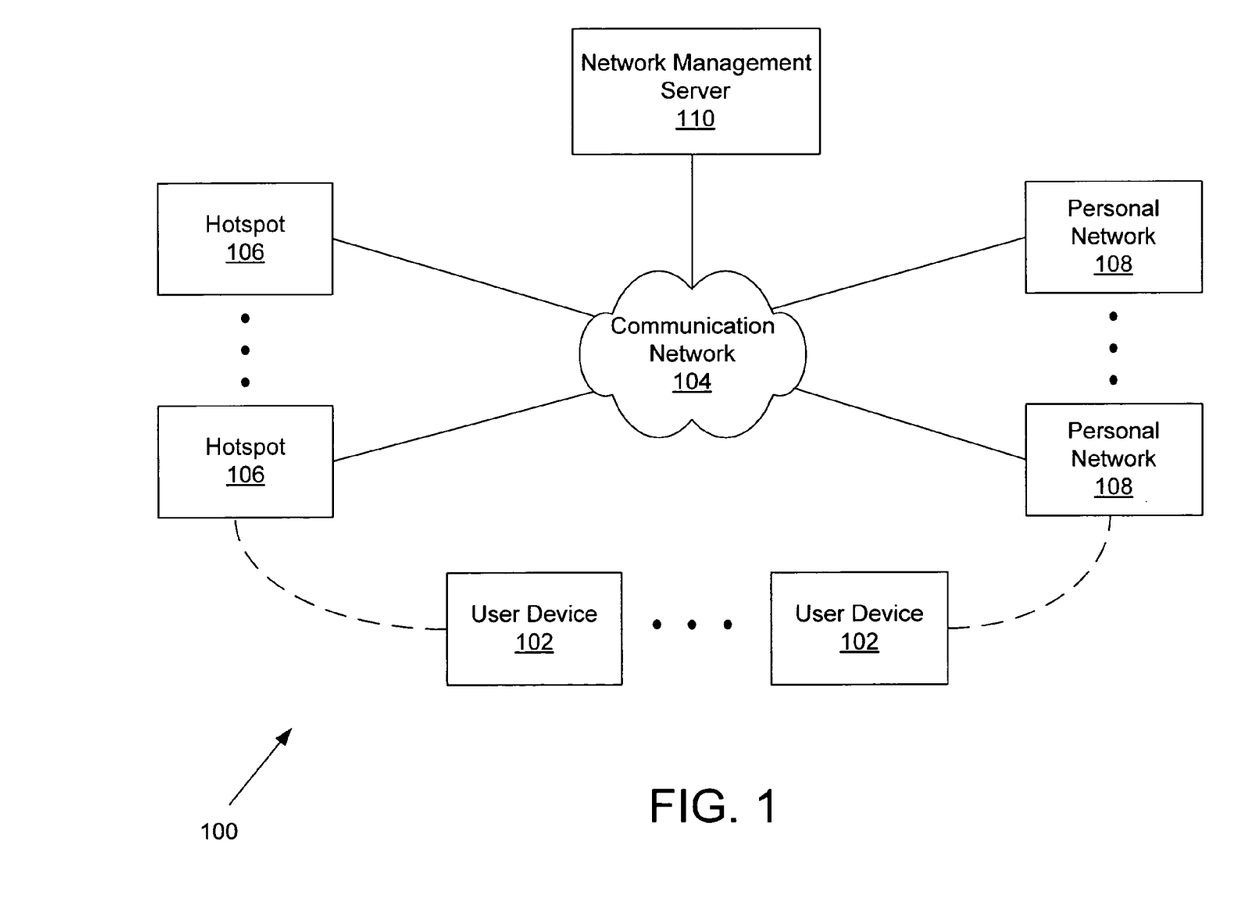
FIG. 1 is a block diagram of an exemplary communication environment in which embodiments of the present invention may be practiced.

Referring to FIG. 1, an exemplary communication environment 100 in which embodiments of the present invention may be practiced is shown. In exemplary embodiments, a plurality of user devices 102 may communicate with a communication network 104 via a hotspot 106 or a personal network 108. The user devices 102 may comprise computers, laptops, cameras, personal media players, gaming systems, phones, or any other Wi-Fi enabled devices. The communication network 104 may comprise the Internet.

The hotspot 106 may comprise a geographic boundary covered by a Wi-Fi (802.11) wireless access point. Typically, the hotspot 106 is configured for communication network 104 access, whereby any user device 102 within the hotspot 106 can connect to the communication network 104. In embodiments where the hotspot 106 is public, the hotspot 106 does not require an authorization password or key for access. In embodiments where the hotspot 106 is not public, a security key may be associated with the hotspot 106, which will need to be provided to any user device 102 in order for the user device 102 to access the hotspot 106.

The personal network 108 may comprise a private Wi-Fi network established by a user. In some embodiments, the personal network 108 comprises a Wi-Fi network within the user's home or business which communicates with the communication network 104 via broadband. In many embodiments, the personal network 108 will comprise added security such as WEP or WPA which provides an encryption key. Without the key, user devices 102 will not be able to utilize the protected personal network 108. While Wi-Fi personal networks 108 are discussed, alternative personal networks 108 are contemplated. Those skilled in the art will appreciate that there may be many ways to add security to a personal network 108.

The environment 100 further comprises a network management server 110 configured to manage communication network 104 access for registered user devices 102 and personal networks 108. In exemplary embodiments, the network management server 110 provides a central location whereby a user can manage their personal networks 108 as well as hotspots 106 frequently used by the user. This allows the user to easily associate user devices 102 with their personal networks 108 and hotspots 106, and to share their personal networks 108 with other registered users. The network management server 110 will be discussed in more detail in connection with FIG. 2.

It should be noted that the environment of FIG. 1 is exemplary. Alternative embodiments may comprise any number of user devices 102, hotspots 106, and personal networks 108 coupled in communication. Furthermore, any number of network management servers 110 may be provided.

Figure 2:
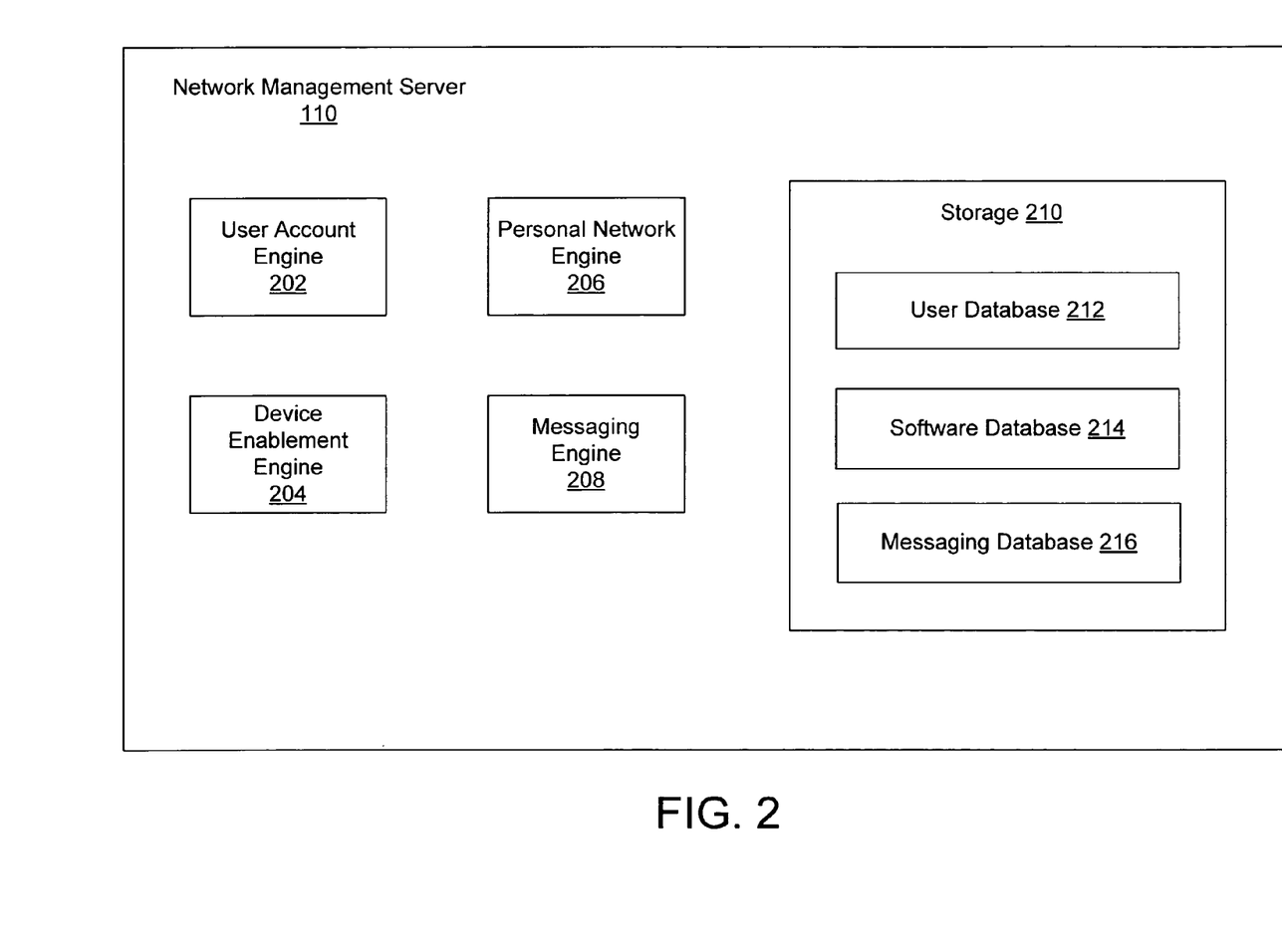
FIG. 2 is a block diagram of an exemplary network management server.

Referring now to FIG. 2, the exemplary network management server 110 is shown in more detail. The exemplary network management server 110 may comprise a user account engine 202, a device enablement engine 204, a personal network engine 206, and a messaging engine 208. Additionally, the network management server 110 may comprise storage 210 that includes one or more databases. These databases may comprise a user database 212, a software database 214, and a messaging database 216. Alternative embodiments may combine functions of some of these engines and databases, or comprise other engines, modules, and databases.

The exemplary user account engine 202 is configured to manage user accounts with the network management server 110. The accounts engine will be discussed in more detail in connection with FIG. 3.

In exemplary embodiments, the device enablement engine 204 is configured to manage user devices 102 associated with users registered with the network management server 110. The exemplary device enablement engine 204 may provide software and network profile information to the user devices 102. The device enablement engine 204 will be discussed in more detail in connection with FIG. 4.

The exemplary personal network engine 206 is configured to manage the private/personal networks 108 of each user. The personal network 108 may comprise any Wi-Fi network established by the user for their own usage (e.g., home or business network). In exemplary embodiments, the user may share their personal network 108 with other users, including registered users having accounts with the network management server 110. The personal network engine 206 will be discussed in more detail in connection with FIG. 5.

In exemplary embodiments, the messaging engine 208 provides messaging functionality to users of the network management server 110. In some embodiments, the messaging engine 208 provides templates from the messaging database 216 which may be filled in or customized by the users. The messages may comprise invitations and requests to share a user's personal network 108. Other messages such as, for example, new user referrals are also contemplated.

If the user is logged in with the network management server 110, messages may be automatically customized for the user by the messaging engine 208. For example, a "from" field may be populated with the user's name and/or e-mail address.

In exemplary embodiments, the messaging engine 208 may perform, in part, via email, instant message (IM), or short message service (SMS). In one example, a customized message may be sent to another user's cell phone by SMS messaging. In other embodiments, the messaging engine 208 works with other third-party services or servers including email servers, web servers, IM servers, SMS servers, and the like.

The user database 212 stores data associated with each registered user. The data may comprise a user name, contact information, password, listing of hotspots 106 and personal networks 108 associated with the user, listing of user devices 102 used by the user, and any other information which may be associated with or identify the user, the user's user devices 102, and hotspots/networks 106 and 108.

The software database 214 comprises software that may be installed in user devices 102 in order for the user devices 102 to function with the network management server 110. In some embodiments, the software may be installed at manufacture of the user devices 102. In other embodiments, the software may need to be downloaded from the software database 214. The exemplary software configures the user device 102 to poll information from, and provide information to, the network management server 110 as will be described in more detail below.

Figure 3:
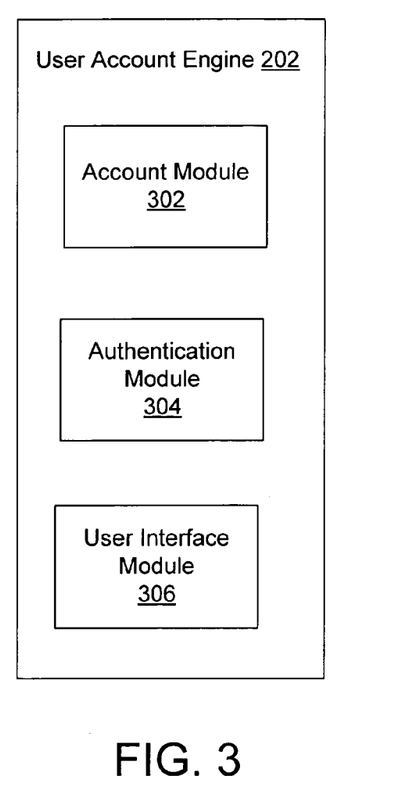
FIG. 3 is an exemplary block diagram of a user account engine.

FIG. 3 illustrates a block diagram of the exemplary user account engine 202. The user account engine 202 may comprise an account module 302, an authentication module 304, and a user interface module 306. The account module 302 is configured to register and maintain a user's account with the network management server 110. Initially, the account module 302 will obtain user identification and log in information. The account module 302 may also obtain and manage information regarding user devices 102, hotspots 106, and personal networks 108 associated with the user account.

The exemplary authentication module 304 is configured to verify each user accessing the network management server 110. In some embodiments, the authentication module 304 will compare entered user name and password with user names and passwords stored in the user database 212. Once verified, the user may access and update their account information including their personal networks 108, user devices 102, and list of buddies. Buddies comprise other users that are associated with the registered user's account. In some embodiments, buddies may have access to the registered user's personal networks 108 and/or share their personal networks 108 with the registered user.

The authentication module 304 may further be configured to authenticate via an encryption key. In one example, the user provides a username and a digitally signed password. The authentication module 304 may decrypt the password with an encryption key and then determine if the password is associated with the username. Those skilled in the art will appreciate that there may be many ways to authenticate a user.

The exemplary user interface module 306 is configured to provide web pages associated with each user's account. The web pages may comprise, for example, a networks web page (e.g., listing of all hotspots 106 and personal networks 108 including shared personal networks 108 of the user), a buddy list web page, a device web page (e.g., listing of all user devices 102 registered to the user), and a general account web page (e.g., providing account information such as user name and contact information).

Figure 4:
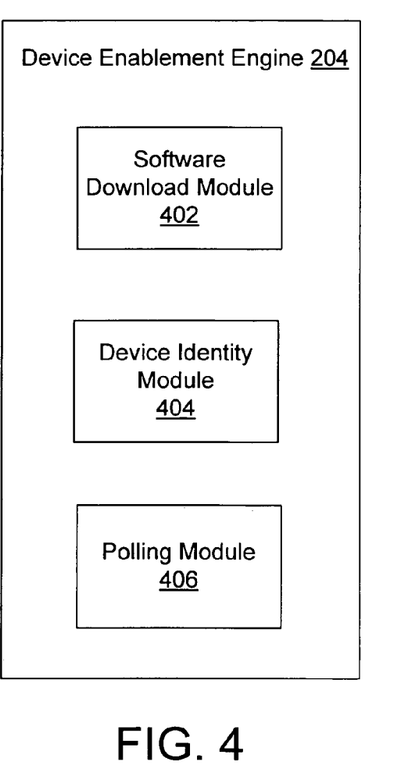
FIG. 4 is an exemplary block diagram of a device enablement engine.

Referring now to FIG. 4, the exemplary device enablement engine 204 is shown. The device enablement engine 204 may comprise a software download module 402, device identity module 404, and a polling module 406. In order to utilize shared networks being managed by the network management server 110, each user device 102 may need to be registered with the network management server 110 and be associated with a user account.

In exemplary embodiments, each user device 102 comprises software which enables the user device 102 to function with the network management server 110. In some embodiments, the software is manufactured in the user device 102. In other embodiments, the software is downloaded from the software database 214 to the user device 102. The software download module 402 provides the software from the software database 214 to the user device 102. In exemplary embodiments, the software download module 402 will determine, based on the user device 102 (e.g., brand, type, etc.,) which software module(s) to provide to the user device. For example, a particular brand of a cellular phone may require a software module that is different from a different brand of cellular phone.

In some embodiments, the software download module 402 receives a user device selection which may identify a user device 102. The user device selection comprises information provided by the user that identifies the user device 102. The software download module 402 may provide the software to the user device 102 based on the user device selection. In one example, the user provides a name of a manufacturer, a model number, and/or a version number for a user device 102 (e.g., via pull down menus or entering the information within a field). The software download module 402 may receive the information and subsequently provide the correct software (e.g., software driver) to the user device 102. In other embodiments, the user chooses the correct software from a list and initiates the software download.

The exemplary device identity module 404 is configured to identify and associate each of the user devices 102 with a user account and one or more Wi-Fi networks (e.g., hotspots 106 and personal networks 108). When the user device 102 is first registered by the user with the network management server 110, the device identity module 404 obtains the device identifier (DID) and stores the DID in the user database 212. In some embodiments, the user device 102 may provide a pin number or other identification number associated with the network management server 110. The user takes the pin/identification number and accesses a website associated with the network management server 110. Either before or after logging in with the network management server 110, a field within the website is provided for entry of the pin/identification number. The device is then associated with the user and the user's account.

The (DID) may comprise any identifier that is associated with the device. In one example, the DID is a media access control (MAC) address. The DID may be based on a component of the device (such as the MAC address), chosen by the user, or may be generated by the device enablement engine 204.

The exemplary polling module 406 exchanges data with each user device 102. In some embodiments, the polling module 406 provides network profiles, as will be discussed in more detail below, to the user device 102, which will provision the user device 102 to work on the associated personal network 108. In further embodiments, the polling module 406 will receive verification requests from the user devices 102. The verification requests are used to confirm network addresses and connectivity of the user devices 102. In return, the polling module 406 may provide an acknowledgement confirming connectivity and provide any network profiles that are queued up for the user device 102. In accordance with one embodiment, the exchanged data may be encrypted. The verification requests may occur when the user device 102 attempts to connect with a hotspot 106 or personal network 108. Additionally, the verification request may occur periodically.

Figure 5:
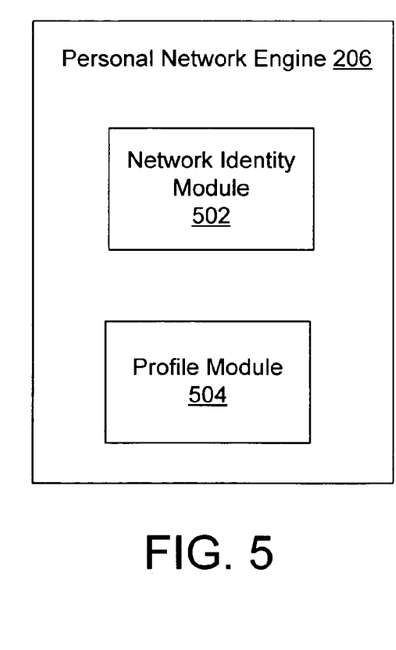
FIG. 5 is an exemplary block diagram of a personal network engine.

Referring now to FIG. 5, an exemplary block diagram of the personal network engine 206 is shown. The personal network engine 206 may comprise a network identity module 502 and a profile module 504.

In exemplary embodiments, the network management server 110 allows users to manage their personal networks 108, as well as hotspots 106, and configure their user devices 102 to work with these personal networks 108 and hotspots 106. The network identity module 502 manages the SSID and other security information for each personal network 108. According to one embodiment, a user may add a personal network 108 to their account by entering their private network credentials (e.g., the SSID, WEP key, WPA pass-phrase, and other network and security information) into a user interface provided by the network identity module 502. In an alternative embodiment, the network credentials may be automatically obtained by the network identity module 502 from the personal network 108. The network credentials may then be stored in the user database 212.

The exemplary profile module 504 is configured to manage network profiles generated from the network credentials for each personal network 108, and provide a resulting network profile to each user device 102 allowed access to the particular personal network 108. Each network profile may be given a common name by the user. For example, the common name may be "My Home Network."

Once the network profile is created, any registered user device 102 associated with the user may automatically receive a copy of the network profile via a secure network connection with the network management server 110. In one embodiment, the secure network connection may comprise HTTP over SLL. Once the network profile is downloaded to the user device 102, the user device 102 may automatically connect to the personal network 108.

In exemplary embodiments, when access to the personal network 108 changes or is updated, the network profile for the personal network 108 is updated and prepared for forwarding to the affected user devices 102. New user devices 102 also must acquire the network profile in order to access the personal network 108. According to one embodiment, the profile module 504 notifies the polling module 406 to provide the network profile during the next poll by the affected user devices 102 (e.g., queue up the user device 102 for receiving the network profile).

Once a personal network 108 is registered with the network management server 110 and the corresponding network profile is created, the personal network 108 may be shared with other users. In one instance, the personal network 108 may comprise a user's home Wi-Fi network. Subsequently, the user may have one or more friends over at his home who wants to use the home Wi-Fi network. For example, an online gaming social event may be hosted at the home, or a guest may want to share their MP3 files or photos from their Wi-Fi enabled user device 102.

Figure 6:
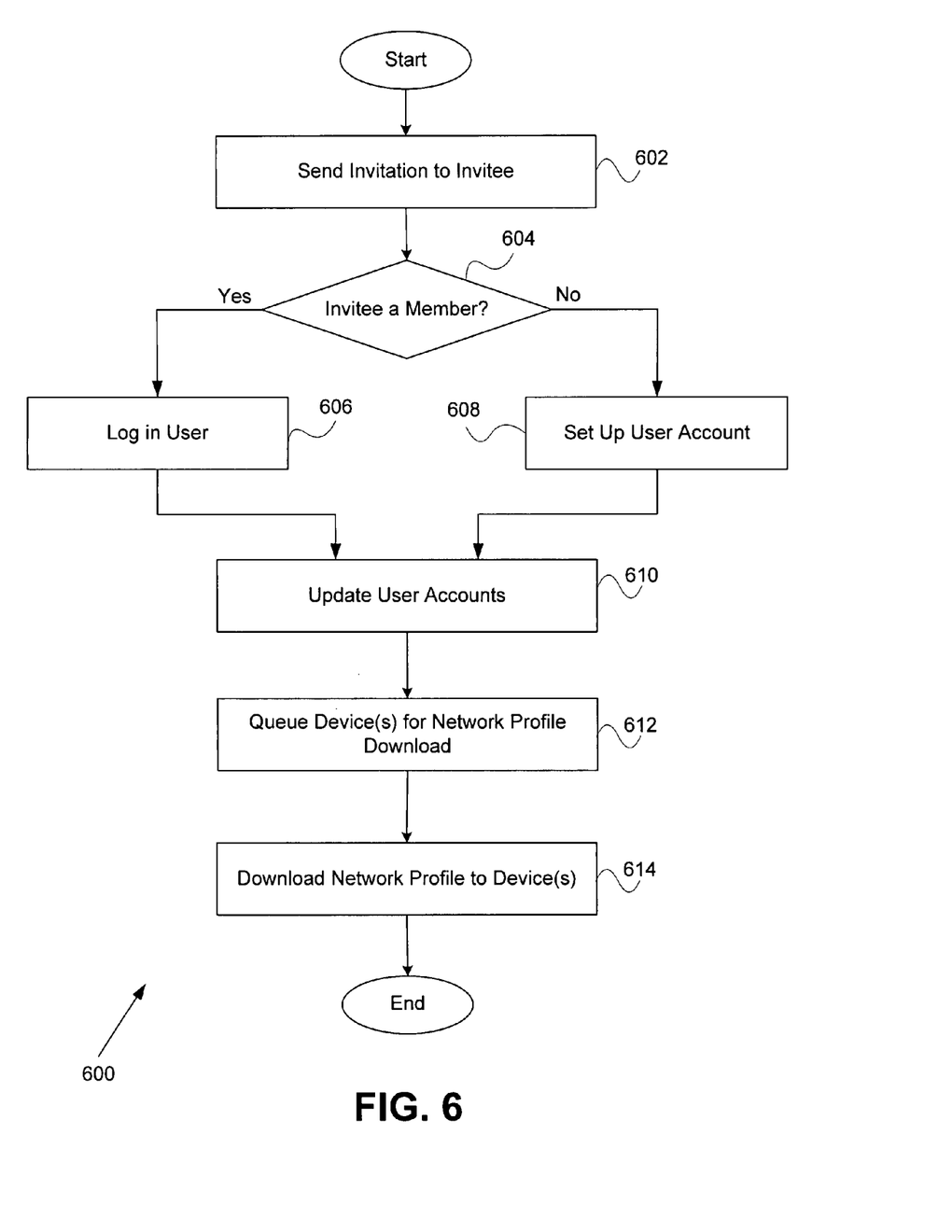
FIG. 6 is a flowchart of an exemplary method for providing access to a personal network via an invitation.

In accordance with some embodiments, the registered user may share their personal network 108 by inviting another user. FIG. 6 is a flowchart 600 of an exemplary method for providing access to a personal network via an invitation. Initially, the registered user may log in with the network management server 110. Once logged in, the user may send an invitation to an invitee in step 602. In one embodiment, the messaging engine 208 may access the messaging database 216 and provide an e-mail template comprising the invitation. The user provides a name or e-mail address of the invitee and can customize a message in the invitation.

Once the invitee receives the invitation, the invitee will decide if they would like to share the personal network 108 of the inviter. If the invitee wants to share the personal network 108, then, in one embodiment, the invitee will select a link embedded in the invitation, which will direct the invitee to a website of the network management server 110.

The network management server 110 then determines in step 604 whether the invitee is a registered user with the network management server 110. The determination may be based on the e-mail address associated with the invitee. If the invitee is a registered user, then the invitee is requested to log in. The invitee may provide a password or other login information. The authentication module 304 will then verify the invitee in step 606.

If the invitee is not a registered user, then the invitee may be presented with an opportunity to register with the network management server 110. The account module 302 will set up the new user account in step 608.

Once the user is logged in with the network management server 110 and has accepted the invitation, the network management server 110 will update the users accounts in step 610. In exemplary embodiments, the invitee may be added as a "buddy" on the inviter's account. The inviter can view their list of buddies as well as manage which buddies have access to which personal networks 108. On the invitee's account, the shared personal network will be added to the invitee's list of networks.

In some embodiments, if the invitee has their own personal networks 108, the network management server 110 may ask the invitee if they would like to share their personal networks 108 with the inviter. If so, the invitee is now the inviter and vice-versa. The steps of FIG. 6 may then be performed.

In step 612, the buddy (i.e., invitee) user devices 102 are queued up to receive the network profile of the shared personal network 108. In exemplary embodiments, the profile module 504 will indicate to the polling module 406 which user devices 102 will require the network profile for the newly shared personal network 108.

The next time the indicated user device 102 polls the network management server 110, the network profile will be provided to the user device 102 in step 614. Polling may occur periodically or when the user device 102 connects to a hotspot 106 or another personal network 108 (e.g., the buddy's own personal network 108 or another user's shared personal network 108). As previously discussed, the network profile comprises the network settings, security information, and/or keys required to access the personal network 108. Once the network profile of the newly shared personal network 108 is downloaded onto the buddy client device 102, the client device 102 is provisioned to use the newly shared personal network 108.

In some embodiments, the buddy user device 102 that is used to accept the invitation may receive the network profile substantially simultaneously with the update to the inviter's account. That is, shortly after the buddy accepts the invitation, the user device 102 used to accept the invitation will receive the network profile without a new connection or substantial period of time passing.

It should be noted that when a user shares their personal network 108 with a buddy, all of the user devices 102 associated with the buddy may be able to use the shared personal network 108. However, if the user has more than one personal network 108, the user may choose to share one or more of the personal networks, but need not share all of them with each buddy. For example, the user may decide to only share personal network A with buddy X, but shares personal networks A and B with buddy Y.

Figure 7:
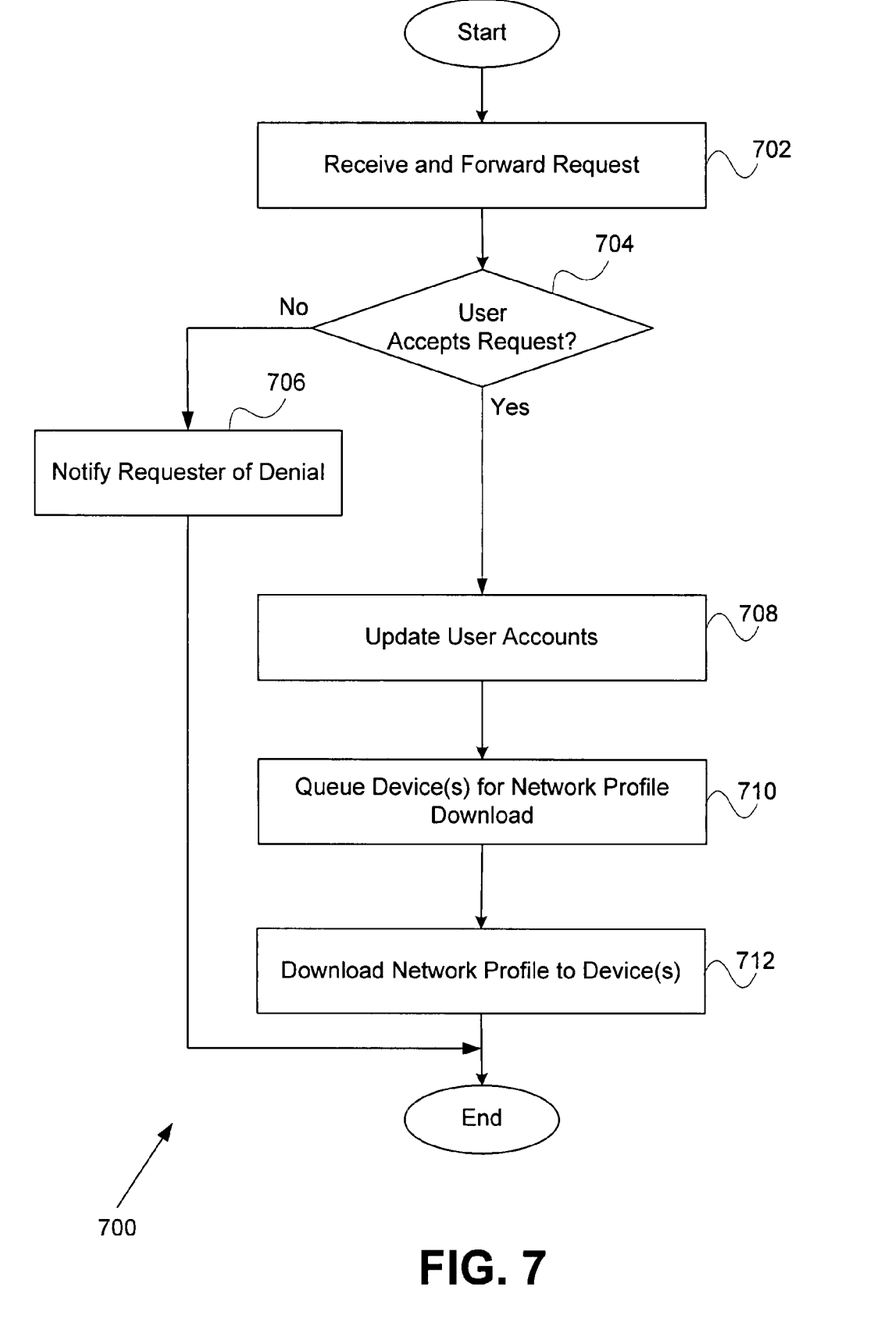
FIG. 7 is a flowchart of an exemplary method for providing access to a personal network via a request.

Referring now to FIG. 7, a flowchart 700 of an exemplary method for providing access to a personal network via a request is shown. Typically, the requestor is a registered member with the network management server 110. As such, the requestor may search for friends who are also registered via a search mechanism provided by the network management server 110, according to one embodiment. Alternatively, the requestor may know that a friend has a personal network 108 and would like access to the personal network 108. Regardless of how the requestor discovers the presence of a personal network 108 he would like access to, the requestor sends a request to the owner of the personal network 108.

In step 702, the network management server 110 forwards the request. In some embodiments, the requestor may utilize a template provide by the messaging engine 208 to generate the request. Generally, the request will comprise the requestor's identity, a statement requesting access to the friend's personal network 108, and a link to a website of the network management server 110.

In step 704, the user (i.e., friend) receives the request and decides if he is willing to share the personal network 108. In some embodiments, the user will log into their account with the network management server 110. The account may provide an indication of the pending request. If the user decides not to share his personal network 108 (e.g., selecting an entry on a webpage that denies the request), then a denial notification will be sent by the messaging engine 208 to the requestor in step 706.

However, if the user accepts the request (e.g., selecting an entry on the webpage that accepts the request), then both users' accounts are updated in step 708. In exemplary embodiments, the requestor may be added as a "buddy" on the sharing user's account. The requesting user's account will also be updated to indicate the shared personal network being available for use.

In step 710, the buddy (i.e., requestor) user devices 102 are queued up to receive the network profile of the newly shared personal network 108. In exemplary embodiments, the profile module 504 will indicate to the polling module 406 which user devices 102 will require the network profile of the newly shared personal network 108.

The next time the indicated user device 102 polls the network management server 110, the network profile will be provided to the user device 102 in step 712. Polling may occur periodically or when the user device 102 connects to a hotspot 106 or another personal network 108 (e.g., the buddy's own personal network 108 or another user's shared personal network 108). As previously discussed, the network profile comprises the network settings, security information, and/or keys required to access the newly shared personal network 108. Once the network profile is downloaded onto the buddy client device 102, the client device 102 is provisioned to use the shared personal network 108.

If the user adds a new personal network 108, the user may share the new personal network 108 with existing buddies. In exemplary embodiments, the user may access their buddy list and select a box indicating the new personal network 108 next to the buddies that the user wants to share the new personal network 108 with. In one embodiment, a message is sent to the buddies that the user wants to share the new personal network 108 with. Steps 610-614 or steps 708-712 are then performed to download the network profiles to the affected user devices 102.

In an alternative embodiment, the affected buddy may not need to respond to the new personal network 108 message. Instead, the network profiles may automatically be queued to be delivered to the affected buddy user devices 102 without the affected buddy having to perform any action.

According to exemplary embodiments, if the user edits a personal network 108 (e.g., change the security key), any affected user devices 102 (including the user's and buddies' user devices 102) will automatically be queued to be updated with the new network profile. In some embodiments, the affected buddies may not receive any notification of the change.

Figure 8:
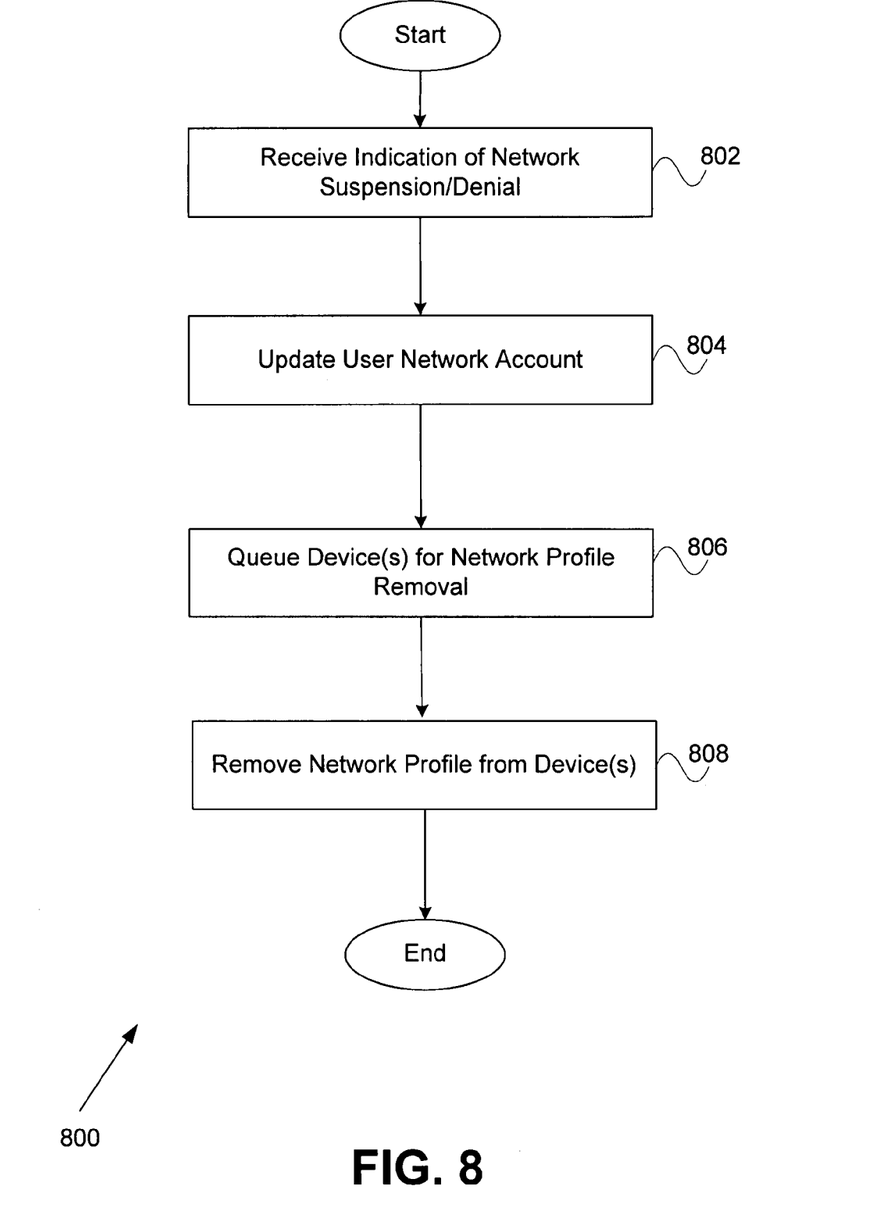
FIG. 8 is a flowchart of an exemplary method for removing access to a personal network.

In some situations, the user may desire to revoke access to their personal network 108 for one or more buddies. FIG. 8 is a flowchart 800 of an exemplary method for removing access. Initially, the user may log in with the network management server 110, and access their account information. In exemplary embodiments, the user may proceed to their buddy list to view the list of buddies and the personal networks 108 being shared with each buddy. The user may then indicate which buddy or personal network 108 being shared should be suspended or denied. In some embodiments, the user may decide to suspend access to one (or more) of several personal networks 108 a buddy is sharing. For example, the user may deselect one of the shared personal networks 108 on the buddy list. In other embodiments, the user may decide to suspend access to the buddy in general. The indication is then received by the network management engine in step 802.

In step 804, the user's account is updated to reflect the suspension of the buddy or personal network 108. In some embodiments, the buddy is removed from the buddy list. Alternatively, the buddy may still be listed, but with an indication that no personal networks 108 are being shared.

In step 806, the buddy user devices 102 are queued up for removal of the network profile of the suspended personal network 108. In exemplary embodiments, the profile module 504 will indicate to the polling module 406 which user devices 102 will require removal of the network profile.

The next time the indicated user device 102 polls the network management server 110, the network profile will be removed from the user device in step 808. Polling may occur periodically or when the user device 102 connects to a hotspot 106 or personal network 108.

In some embodiments, the suspended buddy may remain on the buddy list with an indication that no personal networks 108 are being shared with the suspended buddy. A 're-activate" button may also be provide next to the suspended buddy name in case the user wants to share his personal networks 108 with the suspended buddy in the future.

The above-described functions and components can be comprised of instructions that are stored on a computer readable storage medium (i.e., a machine readable medium). The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and computer readable storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method, executing on a hardware server, for sharing a WiFi network, the method comprising:

receiving first credentials from a first user at the hardware server, the first credentials including a password to access a WiFi network of the first user, the first credentials to be associated with a user account of the first user;

receiving an indication from the first user, at the hardware server, to share access to the WiFi network with a second user, the indication including second credentials to access the user account of the first user;

authenticating the second credentials from the indication;

generating a network profile, by a processor of the hardware server, the network profile comprising the received first credentials including the password to access the WiFi network of the first user;

if the second credentials are successfully authenticated, queuing, by the processor of the hardware server and based on the indication, one or more user devices of the second user to receive the network profile; and providing the network profile from the hardware server to the one or more user devices to provision the one or more user devices with the received first credentials including the password to enable the one or more user devices of the second user to provide the received first credentials to a network device for accessing the WiFi network.

2. The method of claim 1 further comprising providing an invitation message from the first user to the second user to share the WiFi network.

3. The method of claim 1 further comprising providing a request message from the second user to the first user to share the WiFi network.

4. The method of claim 1 further comprising authenticating the and second user to provide the users access to respective accounts of the users.

5. The method of claim 1 further comprising setting up an account for the second user.

6. The method of claim 1 further comprising updating accounts, by the processor of the hardware server, of the first and second users to indicate the sharing of the WiFi network.

7. The method of claim 1 wherein providing the network profile comprises providing the network profile during a next poll by the one or more user devices.

8. The method of claim 7 wherein the next poll occurs periodically.

9. The method of claim 7 wherein the next poll occurs when the one or more user devices connects to a network.

10. The method of claim 1 further comprising suspending sharing of the WiFi network.

11. The method of claim 10 further comprising queuing the one or more user devices for removal of the network profile and removing the network profile.

12. The method of claim 1 further comprising providing a search mechanism to the first user to search for other users to share the WiFi network.

13. The method of claim 1 further comprising providing software to the one or more user devices, the software configuring the one or more user devices to operate with a network management server managing the sharing of the WiFi network.

14. The method of claim 1 further comprising allowing the second user to share WiFi networks of the second user with the first user.

15. The system of claim 1, wherein the received first credentials further comprise an encryption key.

16. A hardware system for sharing a WiFi network, comprising:
   a processor;
   a messaging engine configured to control the processor to send and receive messages regarding sharing of the WiFi network;
   a personal network engine configured to control the processor to receive first credentials including a password from a first user to access the WiFi network, the first credentials to be associated with a user account of the first user, and to generate a network profile comprising the credentials including the password to access the WiFi network of the first user; and
   a polling module configured to control the processor to, after successful authentication of second credentials of an indication from the first user to share access to the WiFi network with a second user, provide the network profile to one or more user devices of the second user with the received first credentials including the password to enable the one or more user devices of the second user to provide the received first credentials to a network device for accessing the WiFi network.

17. The system of claim 16 further comprising an account module configured to control the processor to manage user accounts including sharing of the WiFi network.

18. The system of claim 16 further comprising a software download module configured to control the processor to provide software to the one or more user devices, the software configuring the one or more user devices to operate with a network management server managing the sharing of the WiFi network.

19. A non-transitory machine readable medium having embodied thereon a program, the program comprising instructions operable by a machine for performing a method, the method comprising:
   receiving first credentials from a first user at the hardware server, the first credentials including a password to access a WiFi network of the first user, the first credentials to be associated with a user account of the first user;
   receiving an indication from the first user, at a hardware server, to share access to the WiFi network with a second user, the indication including second credentials to access the user account of the first user;
   authenticating the second credentials from the indication;
   generating a network profile, by a processor of the hardware server, the network profile comprising the received first credentials including the password to access the WiFi network of the first user;
   if the second credentials are successfully authenticated, queuing, by the processor of the hardware server and based on the indication, one or more user devices of the second user to receive the network profile; and
   providing the network profile from the hardware server to the one or more user devices to provision the one or more user devices with the received first credentials including the password to enable the one or more user devices of the second user to provide the received first credentials to a network device for accessing the WiFi network.

* * * * *

UNITED STATES PATENT AND TRADEMARK OFFICE
CERTIFICATE OF CORRECTION

PATENT NO. : 9,531,835 B2
APPLICATION NO. : 11/823698
DATED : December 27, 2016
INVENTOR(S) : Simon Wynn et al.

Page 1 of 1

It is certified that error appears in the above-identified patent and that said Letters Patent is hereby corrected as shown below:

In the Claims

Claim 4, Column 11, Lines 20-21:
"authenticating the and second user" should read -- authenticating the first and second users --.

Claim 19, Column 12, Lines 31-32:
"from a first user at the hardware server" should read -- from a first user at a hardware server --.

Claim 19, Column 12, Lines 36-37:
"from the first user, at a hardware server" should read -- from the first user, at the hardware server --.

Signed and Sealed this
Thirtieth Day of May, 2017

Michelle K. Lee
*Director of the United States Patent and Trademark Office*